United States Patent
Remy

(10) Patent No.: US 11,511,859 B2
(45) Date of Patent: Nov. 29, 2022

(54) COLLET TYPE SUSPENSION MECHANISM FOR AIRBORNE STORES FOR REDUCED AERODYNAMIC DRAG

(71) Applicant: Raytheon Company, Waltham, MA (US)

(72) Inventor: Christopher D. Remy, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 49 days.

(21) Appl. No.: 17/143,319

(22) Filed: Jan. 7, 2021

(65) Prior Publication Data
US 2022/0212795 A1 Jul. 7, 2022

(51) Int. Cl.
*B64D 1/12* (2006.01)
*B64D 1/04* (2006.01)
*B64D 1/10* (2006.01)

(52) U.S. Cl.
CPC .............. *B64D 1/12* (2013.01); *B64D 1/04* (2013.01); *B64D 1/10* (2013.01)

(58) Field of Classification Search
CPC ......... B64D 1/04; B64D 1/06; F16B 19/1081; F16B 21/02; F16B 21/18; F16B 13/0808; F16B 2200/406; Y10T 403/599; Y10T 403/60; Y10T 403/602; Y10T 403/608; B64C 2201/121; B64C 2201/128
See application file for complete search history.

(56) References Cited

U.S. PATENT DOCUMENTS

| 2,796,284 | A | * | 6/1957 | Benson ............... | B64D 1/04 |
| | | | | | 294/82.26 |
| 3,122,056 | A | | 2/1964 | Fitch et al. | |
| 3,181,908 | A | * | 5/1965 | Clark ............... | B64D 1/06 |
| | | | | | 294/82.26 |
| 3,195,406 | A | * | 7/1965 | Toomey, Jr. ......... | F42B 10/38 |
| | | | | | 89/1.819 |

(Continued)

FOREIGN PATENT DOCUMENTS

| AU | 2269377 A | 8/1978 |
| CA | 2482342 A1 | 7/2005 |

(Continued)

OTHER PUBLICATIONS

International Search Report and Written Opinion from PCT Application Serial No. PCT/US2021/054772, dated Jun. 10, 2022, 14 pages.

*Primary Examiner* — Joshua J Michener
*Assistant Examiner* — Ka Chun Leung
(74) *Attorney, Agent, or Firm* — Kinney & Lange, P.A.

(57) ABSTRACT

A suspension lug arrangement for a store suitable for aerial deployment has an outer surface and includes at least one lug region including a lug disposed in a body of the store. The lug includes a base portion embedded within and joined to the body of the store and a head portion extending outward from the base portion to the outer surface of the store, the head portion including an outer surface aligned with an adjacent portion of the outer surface of the body. The at least one lug region further includes a well at least partially surrounding the lug, a compressible member disposed within the well, and a plug retained within the well and engaging the compressible member disposed therein.

19 Claims, 10 Drawing Sheets

(56) References Cited

U.S. PATENT DOCUMENTS

| | | | |
|---|---|---|---|
| 3,754,803 A | 8/1973 | Underwood et al. | |
| 4,167,258 A | 9/1979 | Robertson | |
| 4,187,761 A | 2/1980 | Holt et al. | |
| 4,257,639 A | 3/1981 | Stock | |
| 4,346,862 A | 8/1982 | Richburg | |
| 4,441,674 A | 4/1984 | Holtrop | |
| 4,660,456 A | 4/1987 | Griffin et al. | |
| 5,056,408 A * | 10/1991 | Joner | F42B 25/00 89/1.819 |
| 5,406,876 A * | 4/1995 | Harless | B64D 1/06 89/1.51 |
| 5,904,324 A | 5/1999 | Di Bella | |
| 5,927,649 A | 7/1999 | Nykiforuk | |
| 5,961,075 A | 10/1999 | Russell, III | |
| 6,035,759 A | 3/2000 | Jakubowski, Jr. et al. | |
| 6,196,514 B1 | 3/2001 | Keinholz | |
| 6,212,987 B1 | 4/2001 | Jakubowski, Jr. et al. | |
| 6,782,665 B2 | 8/2004 | Fahrion | |
| 7,000,733 B2 | 2/2006 | Cunniffe | |
| 7,156,347 B2 | 1/2007 | Lam et al. | |
| 7,690,304 B2 * | 4/2010 | Roemerman | F42C 15/005 89/1.55 |
| 8,573,536 B2 | 11/2013 | McGeer et al. | |
| 2006/0119175 A1 | 6/2006 | Garzo | |
| 2009/0152391 A1 | 6/2009 | McWhirk | |
| 2020/0164984 A1 * | 5/2020 | Keller | B64D 1/04 |

FOREIGN PATENT DOCUMENTS

| | | | |
|---|---|---|---|
| DE | 3131376 A1 | 3/1983 | |
| EP | 0941923 A2 | 9/1999 | |
| GB | 556933 | 10/1943 | |
| GB | 590271 | 7/1947 | |
| GB | 680262 | 10/1952 | |
| GB | 755657 | 8/1956 | |
| GB | 797105 | 6/1958 | |
| GB | 807554 | 1/1959 | |
| GB | 809151 | 2/1959 | |
| GB | 1002271 | 8/1965 | |
| GB | 2072812 A | 10/1981 | |
| IN | 202031 | 2/2006 | |
| IN | 200403619 | 10/2009 | |
| NL | 42064 C | 11/1937 | |
| WO | WO 82/02527 | * | 8/1982 |
| WO | WO03097453 A2 | 11/2003 | |
| WO | WO2004074091 A2 | 9/2004 | |
| WO | WO2005016749 A1 | 2/2005 | |
| WO | WO2009061347 A1 | 5/2009 | |

* cited by examiner

US 11,511,859 B2

COLLET TYPE SUSPENSION MECHANISM FOR AIRBORNE STORES FOR REDUCED AERODYNAMIC DRAG

BACKGROUND

The present disclosure relates generally to mountable stores, and more particularly, to suspension lug system for releasably mounting an airborne store to a rack.

Two types of standard attachment methods for air-carried weapons include rails and suspension lugs. Weapons carried by suspension lugs are increasingly common, as aircraft move toward internal carriage of weapons where rail launching is not applicable. While suspension lugs are standard items and are compatible with a large number of military standard bomb racks, these lugs protrude from the outer mold line of the weapon and impose a significant aerodynamic penalty. The aerodynamic issues become more pronounced as weapon speed increases and/or weapon size decreases, which are current trends. To address aerodynamic issues, several weapon systems have adopted variants of the standard suspension lugs that rotate into the airframe after weapon release, via spring loaded mechanisms. While reducing the aerodynamic penalty of the protruding lug, it does not create a smooth, uninterrupted surface on the weapon's outer mold line and the mechanism(s) consume critical packaging volume.

New attachment means are desirable for creating an aerodynamic surface without significantly impacting packaging volume.

SUMMARY

A suspension lug arrangement for a store suitable for aerial deployment has an outer surface and includes at least one lug region including a lug disposed in a body of the store. The lug includes a base portion embedded within and joined to the body of the store and a head portion extending outward from the base portion to the outer surface of the store, the head portion including an outer surface aligned with an adjacent portion of the outer surface of the body. The at least one lug region further includes a well at least partially surrounding the lug, a compressible member disposed within the well, and a plug retained within the well and engaging the compressible member disposed therein.

A system for releasably mounting a store suitable for aerial deployment includes a mounting rack securable to an aircraft structure and including at least one collet assembly. The at least one collet assembly includes a cylindrical collar, a shaft disposed within the cylindrical collar, and a plurality of hooked fingers connected to the shaft. The system further includes a suspension lug arrangement on the store, the suspension lug arrangement including at least one lug disposed on the body of the store. The at least one lug includes a base portion embedded within and joined to the body of the store, and a head portion extending outward from the base portion to an outer surface of the body of the store, the head portion comprising an outer surface aligned with an adjacent portion of the outer surface of the body. The arrangement further includes a well at least partially surrounding the at least one lug, a compressible member disposed within the well, and a plug retained within the well and engaging the compressible member. The collet assembly is engageable with the at least one lug.

Figure 1:
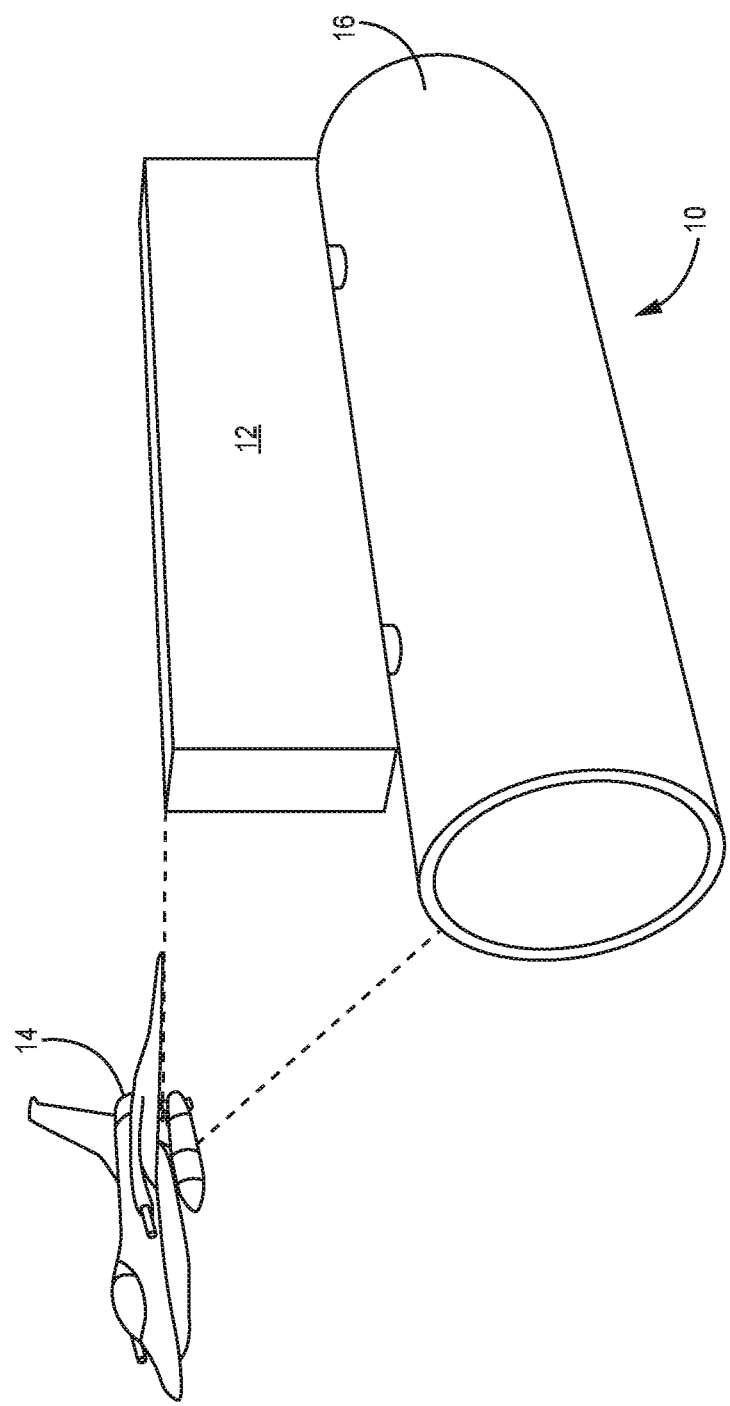
FIG. 1 is a perspective schematic view of a rack-mounted store for use on an aircraft.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a suspension lug arrangement for an airborne store that includes a recessed lug and a spring-loaded plug for providing a smooth and aerodynamic outer store surface when disengaged from a mounting rack. The mounting rack includes a collet assembly corresponding to each suspension lug region on the store. Each collet assembly includes a collar, a shaft, and a plurality of hooked fingers for releasably engaging the recessed lug on the store.

FIG. 1 is a perspective schematic view of store 10 mounted to rack 12 which can itself be mounted to aircraft 14. Aircraft 14 is shown as a jet aircraft but can generally be a manned or unmanned, fixed-wing or rotor craft having one or more locations (e.g., an underside of a wing or fuselage, internal bay, etc.) for mounting store 10 via rack 12. In an exemplary embodiment, store 10 carries munitions (i.e., is a bomb, missile, rocket, etc.) with a mass ranging from 100 pounds up to 2,000 pounds. In an alternative embodiment, store 10 can be any object suitable for aerial deployment, such as a chaff, a fuel pod, a micro-drone, or a surveillance package, to name a few non-limiting examples. As shown in FIG. 1, store 10 has a main body 16 that can include additional features (e.g., radome, fins, sway braces, etc.) not shown for simplicity.

Figure 2:
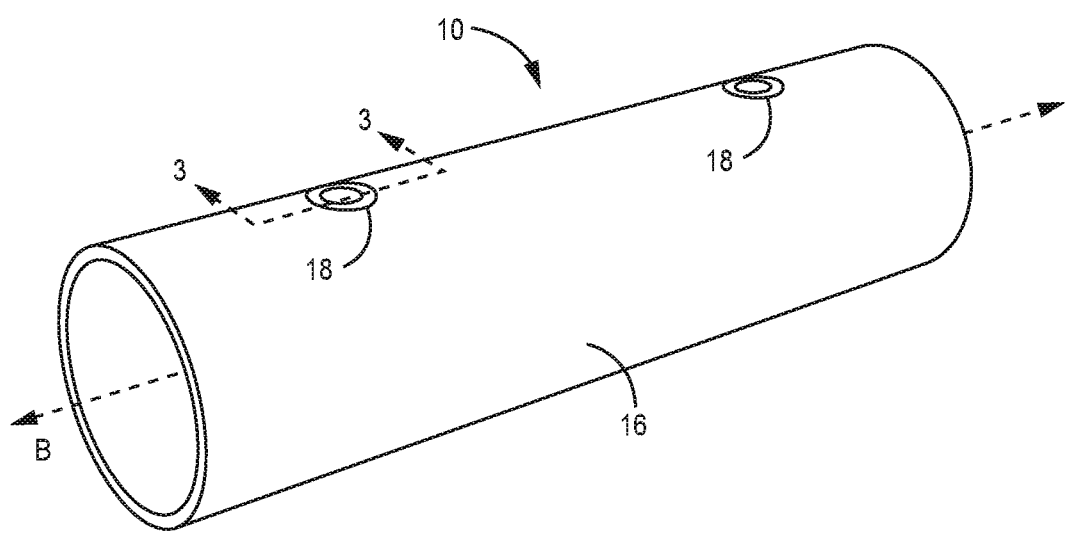
FIG. 2 is a schematic perspective view of the store showing suspension features and illustrating section line 3-3.
Figure 3:
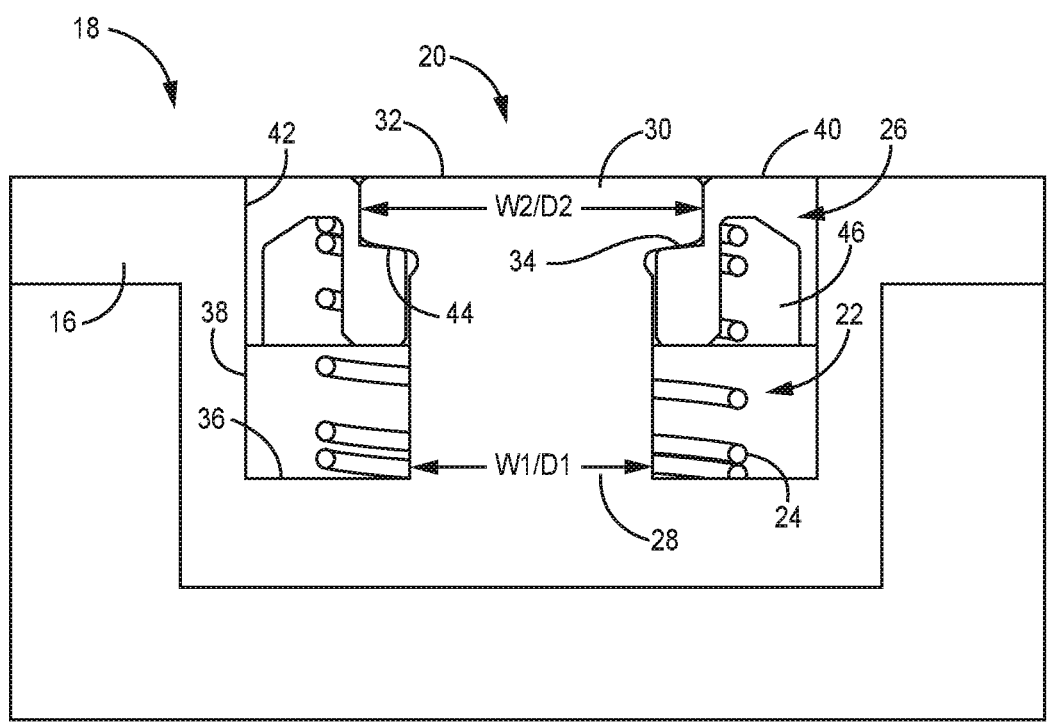
FIG. 3 is a cross-sectional view of a suspension feature taken along line 3-3 of FIG. 2.

FIG. 2 is a schematic perspective view of body 16 of store 10 showing suspension lug regions 18. FIG. 3 is a cross-sectional view of a suspension lug region 18 taken along line 3-3 of FIG. 2. FIGS. 2 and 3 will be discussed together. Each region 18 includes lug 20, well 22, compressible member 24, and plug 26. Lug 20 includes base 28 in communication with body 16, and an oppositely disposed head 30. Base 28 has a first width W1 in the direction of longitudinal body axis B and head 30 has a second width W2. In the embodiment shown, lug 20 is a circular structure such that the first and second widths W1, W2 can alternatively be referred to as first and second diameters D1 and D2, respectively. Second width W2 is greater than first width W1 giving lug 20 a generally T-shaped cross-sectional geometry. In an alternative embodiment, lug 20 can have other geometries such as polygonal or elliptical, with generally equal dimensions (e.g., squared, hexagonal, etc.) or elongate in one direction, for example, with a greater length (not shown) perpendicular to the width. Lug can be formed from a metallic material such as steel. Although a variety of lug geometries are conceivable, all would maintain a head wider, at least in one dimension, than the base.

Base 28 can be attached to body 16 of store 10 using a metallurgical joining technique (e.g., welding, brazing, etc.), or base 28 can be fastened to body 16 via threaded engagement or some other fastening means. Head 30 has an outer surface 32 (surface furthest from base 28) aligned with the outer surface of body 16, and an inner surface 34 which can be an overhang surface created by the greater width W2 of head 30. Inner surface 34 can be slightly angled with respect to body axis B.

Well 22 is shown as a void surrounding lug 20 and is defined by an axially disposed floor 36 and radially disposed wall 38, relative to body axis B. Compressible member 24 is shown as a spring (hereinafter referred to as spring 24) and can be compressed in the radial direction toward floor 36 under an applied force. As the force is reduced/removed, spring 24 expands upward toward head 30 of lug 20. Plug 26 is disposed within well 22 and includes outer surface 40 and peripheral surface 42 in contact with and slidable along wall 38 of well 22. Plug also includes seat 44 engageable with inner surface 34 of head 30 in its radially outermost position. Such position occurs when no (or insignificant) force acts to compress spring 24. In such a state, as is shown in FIG. 3, the outer surface of body 16 is aligned with outer surface 32 of head 30 and outer surface 40 of plug 26 to create a generally smooth and uninterrupted surface along body 16. Plug 26 is prevented from extending beyond the extent of outer surface 32 of head 30 because of the engagement of seat 44 and inner surface 34. Plug 26 further includes recess 46 for engaging spring 24 such that plug 26 is movable within well 22 with spring 24. Spring 24 and plug 26 can be made from metallic materials.

In the embodiment shown, lug 20 is concentric with well 22, spring 24, and plug 26, each of which fully surrounds lug 20. In an alternative embodiment, any of well 22, spring 24, and plug 26 may be multiple pieces and/or may not completely surround lug 20. For example, well 22 could be configured as two arcuate recesses, each housing a spring 24 and plug 26. Other geometries and/or multi-piece configurations are contemplated herein. The operation of lug 20 and well 22 are described in greater detail below with regard to FIGS. 7-10.

Figure 4:
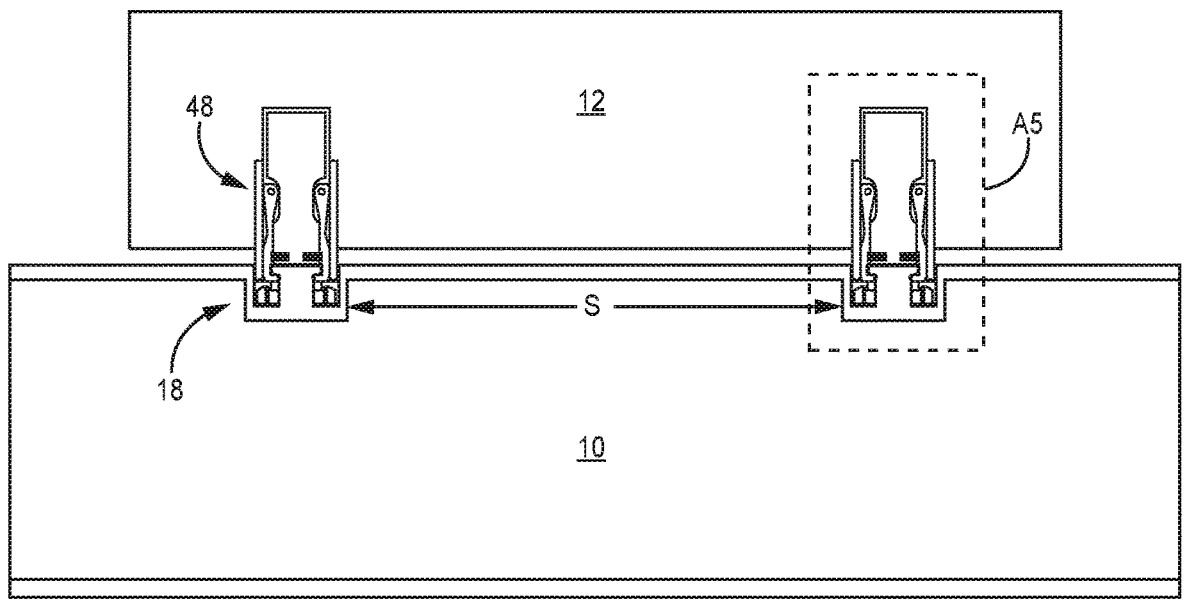
FIG. 4 is a cross-sectional view of the rack-mounted store of in a first state in which the store is secured to the rack, indicating area A5.
Figure 5:
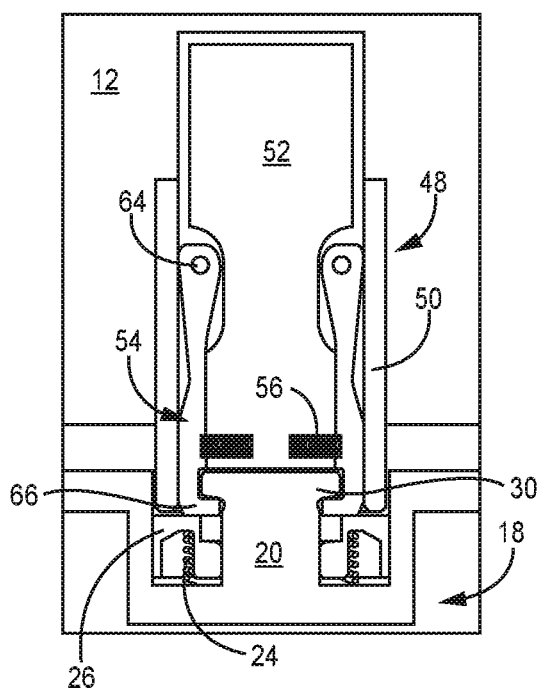
FIG. 5 is a close-up cross-sectional view of area A5 of FIG. 4.
Figure 6:
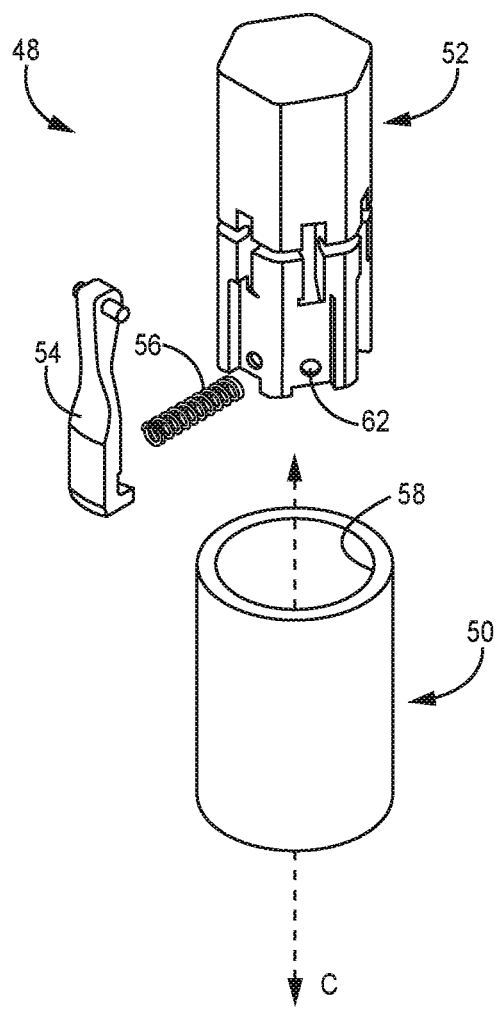
FIG. 6 is an exploded view of a collet assembly showing a single hooked finger for simplicity.

FIG. 4 is a cross-sectional view of store 10 and rack 12 in a first state in which store 10 is releasably mounted to rack 12. FIG. 5 is an enlarged cross-sectional view of detail A5 of FIG. 4. FIG. 6 is an exploded view of a collet assembly shown in FIGS. 4 and 5. FIGS. 4-6 will be discussed together.

As shown in FIG. 4, store 10 includes two suspension lug regions 18, spaced apart a distance S, which can be, for example, 14 in (35.6 cm) to 30 in (76.2 cm), based on common military specifications for airborne stores. Other distances are contemplated herein based on the type, size, and weight of store, to name a few non-limiting examples.

Rack 12 includes two collet assemblies 48 corresponding to lug regions 18 of store 10. Each collet assembly 48 includes cylindrical collar 50 having a collar axis C, shaft 52 movable in the axial direction relative to collar axis C, hooked fingers 54 (only two are visible) attached to shaft 52, and a spring 56 for each hooked finger 54. Each of collar 50, shaft 52, hooked fingers 54, and springs 56 can be formed from various metallic materials or other materials suitable for store-mounting applications.

Collar 50 includes inner surface 58 (labeled in FIG. 6) against which a portion of each hooked finger 54 can come into contact, as is shown in FIG. 5. Collar 50 further extends beyond rack 12 for engagement with well 22 of the corresponding suspension lug region 18. Shaft 52 is coaxial with and slidable within collar 50. In the first state shown in FIGS. 4 and 5, shaft is partially disposed within bore 60 (labeled in FIG. 8) of rack 12 and collar 50. Thus, the first state of rack 12 and store 10 corresponds to a retracted state of shaft 52. An exemplary embodiment includes six hooked fingers 54. As such, shaft 52 is shown in FIG. 6 as a hexagonal structure with six sides, each side configured to accommodate a hooked finger 54, although only one is shown in FIG. 6 for simplicity. However, an alternative embodiment can include anywhere from two to six hooked fingers evenly circumferentially spaced about shaft 52. In an embodiment in which lug 20 is non-circular, collar 50 and shaft 52 can be correspondingly shaped to engage with lug 20. In such an embodiment, hooked fingers 54 can be disposed about shaft 52 in any manner necessary to be evenly distributed about lug 20 when engaged. For even load distribution, hooked fingers 54 can be distributed evenly about the circumference of shaft 52.

Each spring 56 can be at least partially disposed in spring bore 62 (visible and labeled in FIG. 6) of collar 50. Each hooked finger 54 can be attached to collar 50 by pin 64 about which each hooked finger 54 is rotatable to allow each hooked finger 54 to move radially, with respect to collar axis C, as is discussed in greater detail below. Each hooked finger 54 has a hooked end 66 engageable with head 30 of lug 20 in the first state, as is shown in FIGS. 4 and 5. In the first state, collar 50 and hooked fingers 54 force plug 26 and spring 24 downward (toward floor 36 of well 22) permitting hooked end 66 of each hooked finger 54 to engage with head 30 of lug 20, including head inner surface 34. Inner surface 58 of collar 50 prevents radial outward movement of hooked fingers 54 such that store 10 is secured, via suspension lug region 18, to rack 12.

Figure 7:
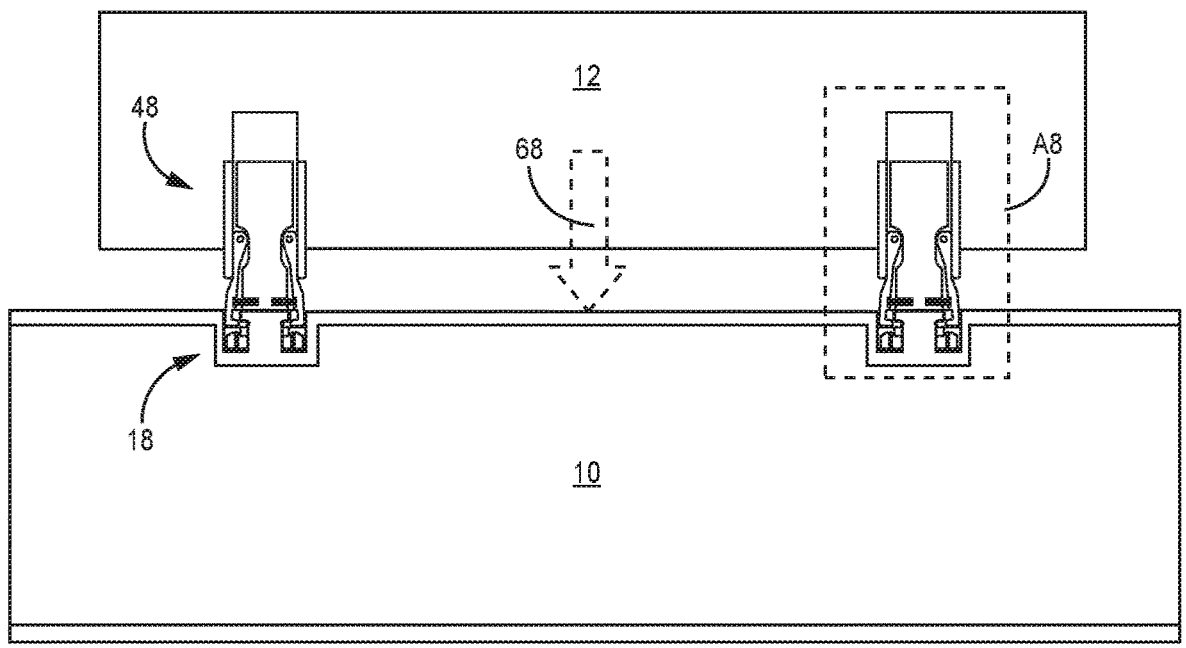
FIG. 7 is a cross-sectional view of the rack-mounted store is a second state in which the store is being released from the rack, indicating area A8.
Figure 8:
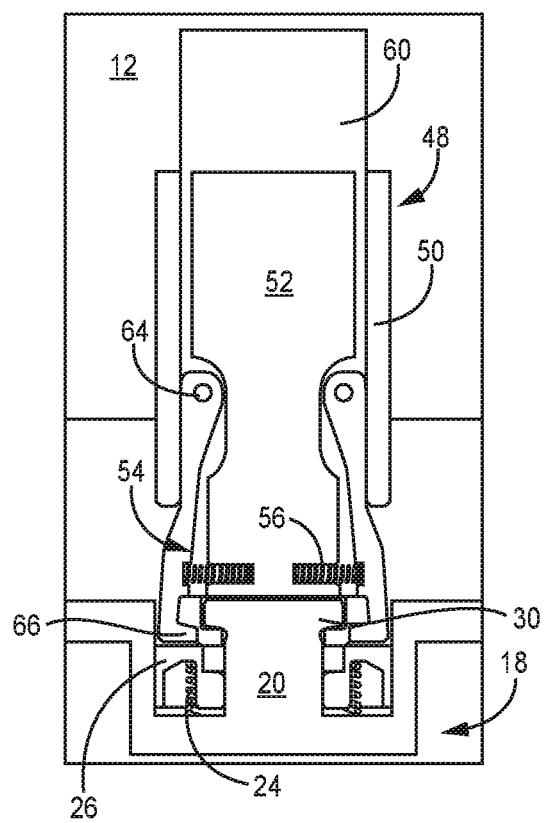
FIG. 8 is a close-up cross-sectional view of area A8 of FIG. 7.

FIG. 7 is a cross-sectional view of store 10 and rack 12 in a second, intermediate state in which store 10 is being released from rack 12. FIG. 8 is an enlarged cross-sectional view of detail A8 of FIG. 8. FIGS. 7 and 8 will be discussed together.

In the second state, piston plunger 68, represented schematically by a downward-facing arrow, pushes store 10 downward/away from rack 12. Piston plunger 68 can be a pneumatic or hydraulic piston, or other type of actuator known in the art. As piston plunger 68 acts to push store 10 downward (away from rack 12), each shaft 52 correspondingly moves downward from bore 60 and collar 50 such that a portion of shaft 52 extends beyond collar 50. Hooked fingers 54 are similarly moved downward and beyond collar 50, as they are attached to shaft 52. Because hooked fingers 54 are no longer radially constrained by inner surface 58 of collar 50, each spring 56 acts to force a hooked finger 54 radially outward, relative to collar axis C. The angle of inner surface 34 of head 30 also facilitates this outward movement. This causes hooked ends 66 to disengage from head 30 of lug 20, and spring 24 releases from its contracted position and forces plug 26 in the direction of head 30.

Figure 9:
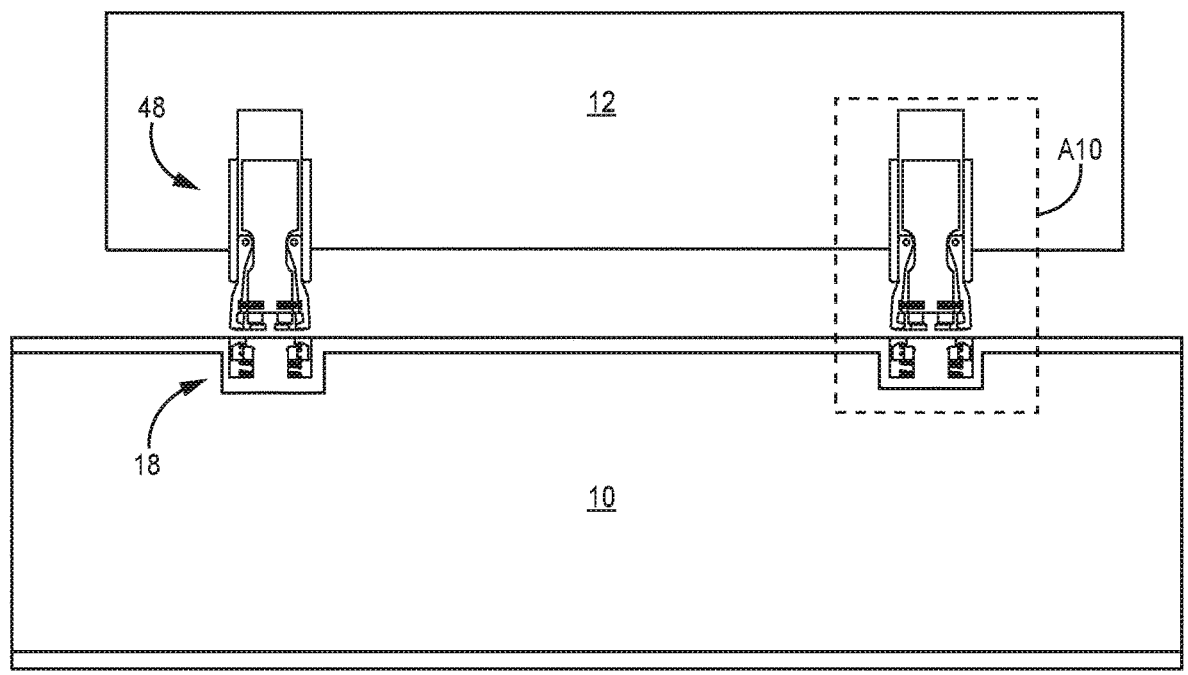
FIG. 9 is a cross-sectional view of the rack-mounted store in a third state in which the store is fully disengaged from the rack, indicating area A10.
Figure 10:
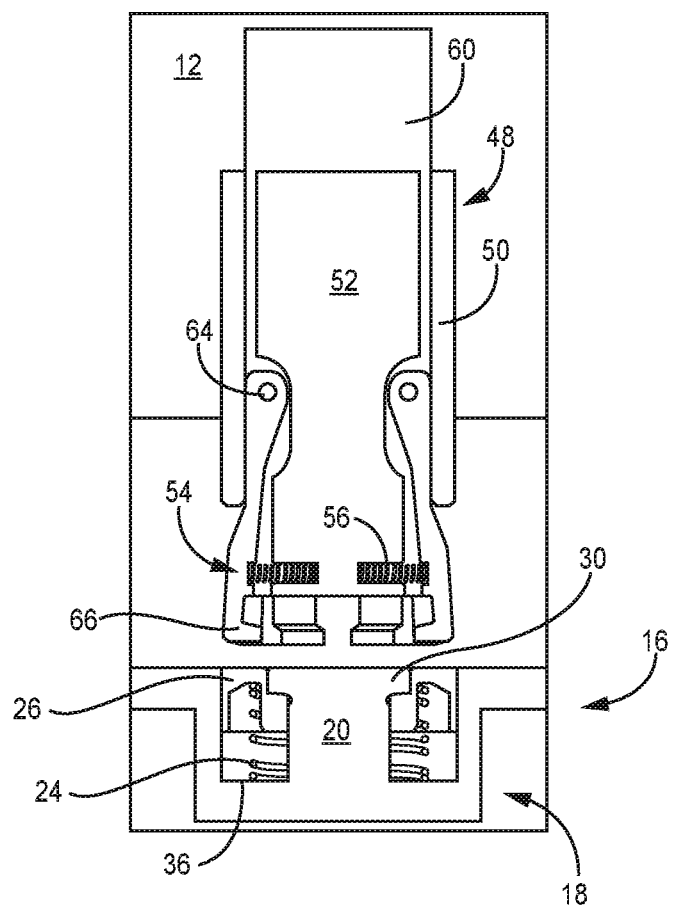
FIG. 10 is a close-up cross-sectional view of area A10 of FIG. 9.

FIG. 9 is a cross-sectional view of store 10 and rack 12 in a third state in which store 10 is disengaged from rack 12. FIG. 10 is an enlarged cross-sectional view of detail A10 of FIG. 9. FIGS. 9 and 10 will be discussed together.

In the third state, store 10 is disengaged (i.e., fully released) from rack 12. As hooked ends 66 disengage from head 30 in the second state, spring 24 releases from a compressed state and it travels away from floor 36 of well 22 pushing plug 26 upward until seat 44 of plug 26 engages inner surface 34 of head 30. The engagement of seat 44 and inner surface 34 (both labeled in FIG. 3) halts upward travel of spring 24 and plug 26, and outer surface 40 of plug 26 is aligned with outer surface 32 of head 30 and the outer surface of body 16 as is shown and described with respect to FIG. 3. This provides a smooth, aerodynamic outer contour along body 16 of store 10.

The third state corresponds to an extended state of shaft 52, in which it does not occupy bore 60 and extends beyond collar 50. Also in the third state, each hooked finger 54 (four are visible in FIG. 10 with two being out of plane) is no longer constrained by engagement with head 30 of lug 20 or being fully retracted within collar 50. Thus, the force exerted by spring 56 moves the corresponding hooked finger 54 radially away from shaft 52, relative to collar axis C. As is shown in FIG. 10, radial movement is, however, limited, by abutting of the portion of hooked finger 54 nearest pin 64 with inner surface 58 of collar 50.

Store 10 and/or rack 12 described above can alternatively have a variety of configurations not discussed above, such as more than two lugs 20 disposed about body 10 with corresponding collet assemblies 48 on rack 12. Collet assembly 48 can include more than six hooked fingers 54 based on the size of lugs 20 and store 10. Springs 56 can also be replaced with linkage assemblies for facilitating radial movement of hooked fingers 54. Other configurations are contemplated herein.

The disclosed suspension lug arrangement has many benefits. In a disengaged state, store 10 has a smooth outer surface well-suited for aerial travel to a target. Each lug has a smaller footprint on store 10 with respect to existing mounting hardware. Existing mounting racks may be outfitted with collet assemblies 48 for accommodating the disclosed suspension lug arrangement.

Discussion of Possible Embodiments

The following are non-exclusive descriptions of possible embodiments of the present invention.

A suspension lug arrangement for a store suitable for aerial deployment has an outer surface and includes at least one lug region including a lug disposed in a body of the store. The lug includes a base portion embedded within and joined to the body of the store and a head portion extending outward from the base portion to the outer surface of the store, the head portion including an outer surface aligned with an adjacent portion of the outer surface of the body. The at least one lug region further includes a well at least partially surrounding the lug, a compressible member disposed within the well, and a plug retained within the well and engaging the compressible member disposed therein.

The arrangement of the preceding paragraph can optionally include, additionally and/or alternatively, any one or more of the following features, configurations and/or additional components:

In the above arrangement, the head portion can be wider than the base portion in a first direction corresponding to a longitudinal body axis such that the lug has a T-shaped cross-sectional geometry.

In any of the above arrangements, the head portion can include an inner surface, and the inner surface can be angled with respect to the body axis.

In any of the above arrangements, the lug can have one of a circular, polygonal, and elliptical shape.

In any of the above arrangements, the compressible member can be a spring concentric with the lug.

In any of the above arrangements, the plug can include a seat for engaging an inner surface of the head of the lug, a recess for engaging the compressible member, and a peripheral surface slidable along a wall of the well.

In any of the above arrangements, the plug can be concentric with the lug.

In any of the above arrangements, when the seat engages the inner surface of the head of the lug, an outer surface of the plug can be aligned with the outer surface of the head.

In any of the above arrangements, the at least one lug region can include a first lug region and a second lug region spaced apart from the first lug region.

A system for releasably mounting a store suitable for aerial deployment includes a mounting rack securable to an aircraft structure and including at least one collet assembly. The at least one collet assembly includes a cylindrical collar, a shaft disposed within the cylindrical collar, and a plurality of hooked fingers connected to the shaft. The system further includes a suspension lug arrangement on the store, the suspension lug arrangement including at least one lug disposed on the body of the store. The at least one lug includes a base portion embedded within and joined to the body of the store, and a head portion extending outward from the base portion to an outer surface of the body of the store, the head portion comprising an outer surface aligned with an adjacent portion of the outer surface of the body. The arrangement further includes a well at least partially surrounding the at least one lug, a compressible member disposed within the well, and a plug retained within the well and engaging the compressible member. The collet assembly is engageable with the at least one lug.

The system of the preceding paragraph can optionally include, additionally and/or alternatively, any one or more of the following features, configurations and/or additional components:

In the above system, the head portion of the at least one lug can be wider than the base portion in a first direction corresponding to a longitudinal axis of the body such that the at least one lug has a T-shaped cross-sectional geometry.

In any of the above systems, the shaft can be slidable within the cylindrical collar between a retracted position and an extended position.

In any of the above systems, while in the retracted position, the shaft can occupy a bore of the rack.

In any of the above systems, while in the retracted position, the plurality of hooked fingers can be secured between an inner surface of the cylindrical collar and the shaft, and while in the extended position, a hooked end of each of the plurality of hooked fingers can extend beyond the cylindrical collar and move radially away from the shaft, relative to a collar axis.

In any of the above systems, when the system is in a mounted state in which the store is secured to the rack, the hooked end of each of the plurality of hooked fingers can engage with the head of the at least one lug, and the shaft can be in the retracted position such that the plurality of hooked fingers are secured between an inner surface of the cylindrical collar and the shaft, and the at least one lug can be secured by the plurality of hooked fingers.

In any of the above systems, when the system is in a disengaged state in which the store is not secured to the rack, the shaft can be in the fully extended position such that the hooked portion of each of the plurality of hooked fingers can extend beyond the cylindrical collar and move radially away from the shaft such that the plurality of hooked fingers can be disengaged from the at least one lug.

In any of the above systems, each of the plurality of hooked fingers can be radially pivotable, relative to the collar axis, about an attachment point to the shaft, and a spring member can force each of the plurality of hooked fingers in a radially outward direction in the fully extended position of the shaft.

In any of the above systems, while in the disengaged state, an outer surface of the plug of the suspension lug arrangement can be aligned with the outer surface of the head of the at least one lug.

In any of the above systems, the at least one collet assembly can include a first collet assembly and a second collet assembly, and the at least one lug can include a first lug and a second lug.

In any of the above systems, the plurality of hooked fingers can include two to six hooked fingers circumferentially disposed about the shaft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A suspension lug arrangement for a store suitable for aerial deployment, the store having an outer surface, the suspension lug arrangement comprising:
   at least one lug region comprising a lug disposed in a body of the store, the lug comprising:
      a base portion embedded within and joined to the body of the store; and
      a head portion extending outward from the base portion to the outer surface of the store, the head portion comprising an outer surface aligned with an adjacent portion of the outer surface of the body;
   a well at least partially surrounding the lug;
   a compressible member disposed within the well; and
   a plug retained within the well and engaging the compressible member disposed therein, the plug comprising:
      a seat for engaging an inner surface of the head portion of the lug;
      a recess for engaging the compressible member; and
      a peripheral surface slidable along a wall of the well.

2. The arrangement of claim 1, wherein the head portion is wider than the base portion in a first direction corresponding to a longitudinal body axis such that the lug has a T-shaped cross-sectional geometry.

3. The arrangement of claim 2, wherein the inner surface of the head portion is angled with respect to the longitudinal body axis.

4. The arrangement of claim 1, wherein the lug has one of a circular, polygonal, and elliptical shape.

5. The arrangement of claim 4, wherein the compressible member is a spring concentric with the lug.

6. A system for releasably mounting a store suitable for aerial deployment, the system comprising:
   a mounting rack securable to an aircraft structure, the mounting rack comprising:
      at least one collet assembly comprising:
         a cylindrical collar;
         a shaft disposed within the cylindrical collar; and
         a plurality of hooked fingers connected to the shaft; and
   a suspension lug arrangement on the store, the arrangement comprising:
      at least one lug disposed in a body of the store, the at least one lug comprising:
         a base portion embedded within and joined to the body of the store; and
         a head portion extending outward from the base portion to an outer surface of the body of the store, the head portion comprising an outer surface aligned with an adjacent portion of the outer surface of the body;
      a well at least partially surrounding the at least one lug;
      a compressible member disposed within the well; and
      a plug retained within the well and engaging the compressible member, the plug comprising:
         a seat for engaging an inner surface of the head portion of the lug;
         a recess for engaging the compressible member; and
         a peripheral surface slidable along a wall of the well;
      wherein the collet assembly is engageable with the at least one lug.

7. The system of claim 6, wherein the head portion of the at least one lug is wider than the base portion in a first direction corresponding to a longitudinal axis of the body such that the at least one lug has a T-shaped cross-sectional geometry.

8. The system of claim 7, wherein the shaft is slidable within the cylindrical collar between a retracted position and an extended position.

9. The system of claim 8, wherein in the retracted position, the shaft occupies a bore of the rack.

10. The system of claim 8, wherein in the retracted position, the plurality of hooked fingers are secured between an inner surface of the cylindrical collar and the shaft, and wherein in the extended position, a hooked end of each of the plurality of hooked fingers extends beyond the cylindrical collar and moves radially away from the shaft, relative to a collar axis.

11. The system of claim 10, wherein when the system is in a mounted state in which the store is secured to the rack:
   the hooked end of each of the plurality of hooked fingers is engaged with the head portion of the at least one lug; and
   the shaft is in the retracted position such that the plurality of hooked fingers are secured between the inner surface of the cylindrical collar and the shaft, and the at least one lug is secured by the plurality of hooked fingers.

12. The system of claim 10, wherein when the system is in a disengaged state in which the store is not secured to the rack, the shaft is in the fully extended position such that the hooked portion of each of the plurality of hooked fingers extends beyond the cylindrical collar and moves radially away from the shaft such that the plurality of hooked fingers are disengaged from the at least one lug.

13. The system of claim 12, wherein each of the plurality of hooked fingers is radially pivotable, relative to the collar axis, about an attachment point to the shaft, and wherein a plurality of spring members corresponding to the plurality of hooked fingers force each of the plurality of hooked fingers in a radially outward direction in the fully extended position of the shaft.

14. The system of claim 12, wherein in the disengaged state, an outer surface of the plug of the suspension lug arrangement is aligned with the outer surface of the head portion of the at least one lug.

15. The arrangement of claim 1, wherein the plug is concentric with the lug.

16. The arrangement of claim 1 wherein when the seat engages the inner surface of the head portion of the lug, and wherein an outer surface of the plug is aligned with the outer surface of the head portion.

17. The arrangement of claim 1, wherein the at least one lug region comprises a first lug region and a second lug region spaced apart from the first lug region.

18. The system of claim 6, wherein the at least one collet assembly comprises a first collet assembly and a second collet assembly, and wherein the at least one lug comprises a first lug and a second lug.

19. The system of claim 6, wherein the plurality of hooked fingers comprises two to six hooked fingers circumferentially disposed about the shaft.

\* \* \* \* \*